(12) United States Patent
Lekutai (10) Patent No.: US 10,341,833 B2
(45) Date of Patent: Jul. 2, 2019

(54) AUTOMATIC PROXIMITY DISCOVERY AREA TECHNIQUE

(71) Applicant: AT&T Mobility II LLC, Atlanta, GA (US)

(72) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/936,810

(22) Filed: Nov. 10, 2015

(65) Prior Publication Data

US 2017/0134883 A1 May 11, 2017

(51) Int. Cl.
| | |
|---|---|
| H04B 7/00 | (2006.01) |
| H04W 4/80 | (2018.01) |
| H04W 76/14 | (2018.01) |
| H04W 76/11 | (2018.01) |

(52) U.S. Cl.
CPC .............. *H04W 4/80* (2018.02); *H04W 76/11* (2018.02); *H04W 76/14* (2018.02); *Y02D 70/1262* (2018.01); *Y02D 70/164* (2018.01); *Y02D 70/26* (2018.01)

(58) Field of Classification Search
CPC ....... H04W 4/02; H04W 48/04; H04W 4/046; H04W 8/22; H04W 4/00; H04W 4/006; H04W 4/12
USPC ....................................................... 455/41.2
See application file for complete search history.

(56) References Cited

U.S. PATENT DOCUMENTS

| | | | |
|---|---|---|---|
| 8,666,373 B2 | 3/2014 | Dessouky et al. | |
| 8,811,258 B2 | 8/2014 | Etemad et al. | |
| 8,849,203 B2 | 9/2014 | Cakulev et al. | |
| 8,903,419 B2 | 12/2014 | Yu et al. | |
| 9,014,657 B2 | 4/2015 | Rohde et al. | |
| 9,043,329 B1* | 5/2015 | Patton ................... | G06F 16/285 707/740 |
| 2010/0161727 A1 | 6/2010 | Shaffer et al. | |
| 2011/0227702 A1* | 9/2011 | Park ........................ | H04W 4/12 340/10.1 |
| 2011/0317569 A1* | 12/2011 | Kneckt ............. | H04W 74/0833 370/252 |
| 2012/0123890 A1 | 5/2012 | Nathan | |
| 2013/0231043 A1 | 9/2013 | Tawfiq Moshtaha et al. | |
| 2013/0287012 A1 | 10/2013 | Pragada et al. | |

(Continued)

OTHER PUBLICATIONS

Best, Daniel M. et al., "Web-Based Visual Analytics for Social Media," AAAI Technical Report WS-12-03 Social Media Visualization, 2012, pp. 2-5.

(Continued)

*Primary Examiner* — Ajibola A Akinyemi (57) ABSTRACT

An automatic proximity discovery area technique uses available social network information to establish a proximity service area and to select and enable one or more host user equipment devices for device-to-device proximity services. The automatic proximity discovery area technique reduces power consumption for device-to-device proximity service discovery and communications. The technique uses social network messages to detect events and initiate discovery of the device-to-device communications in a proximity discovery area without constant querying or permanent discovery facilities, thereby reducing power consumption of device-to-device proximity services.

20 Claims, 5 Drawing Sheets

(56) References Cited

U.S. PATENT DOCUMENTS

| | | |
|---|---|---|
| 2013/0339438 A1 | 12/2013 | Cherian et al. |
| 2014/0050137 A1 | 2/2014 | Alberth, Jr. et al. |
| 2014/0056220 A1 | 2/2014 | Poitau et al. |
| 2014/0162601 A1 | 6/2014 | Kim et al. |
| 2014/0162687 A1 | 6/2014 | Edge |
| 2014/0219261 A1 | 8/2014 | Johnsson |
| 2014/0286193 A1 | 9/2014 | Ghaboosi et al. |
| 2014/0302794 A1* | 10/2014 | Palin .................. H04B 17/00 455/41.2 |
| 2015/0043429 A1 | 2/2015 | Kim et al. |
| 2015/0043448 A1 | 2/2015 | Chatterjee et al. |
| 2015/0063260 A1 | 3/2015 | Kuo |
| 2015/0078228 A1 | 3/2015 | Schwoerer et al. |
| 2015/0087233 A1 | 3/2015 | Kim et al. |
| 2015/0142986 A1 | 5/2015 | Reznik et al. |
| 2015/0146647 A1 | 5/2015 | Chatterjee et al. |
| 2015/0195676 A1 | 7/2015 | Endress et al. |
| 2015/0195677 A1 | 7/2015 | Kondo |
| 2015/0215757 A1 | 7/2015 | Miskiewicz et al. |
| 2015/0223111 A1 | 8/2015 | Lindoff et al. |
| 2015/0230076 A1 | 8/2015 | Hedman et al. |

OTHER PUBLICATIONS

Lin, Xingqin et al., "An Overview of 3GPP Device-to-Device Proximity Services," IEEE Communications Magazine, Apr. 2014, pp. 40-48.

Litou, Iouliana et al., "Efficient Dissemination of Emergency Information using a Social Network," Workshop Proceedings of the EDBT/ICDT 2014 Joint Conference, Mar. 28, 2014, 8 pages.

Networked & Electronic Media, "Position Paper on Intelligent Transport Systems," Oct. 2010, 8 pages (nem-initiative.org).

NTT Docomo, Inc., "Device to Device (D2D) proximity service in LTE," 2014, pp. 1-8 (wdpc.fiu.edu).

Pathania, Deepika and Karlapalem, Kamalakar, "Social Network Driven Traffic Decongestion Using Near Time Forecasting," Proceedings of the 14th International Conference on Autonomous Agents and Multiagent Systems, May 4-8, 2015, pp. 1761-1762.

Prasad, Athul et al., "Energy-Efficient D2D Discovery for Proximity Services in 3GPP LTE-Advanced Networks," IEEE Vehicular Technology Magazine, Dec. 2014, pp. 40-50.

* cited by examiner

AUTOMATIC PROXIMITY DISCOVERY AREA TECHNIQUE

BACKGROUND

Field of the Disclosure

This disclosure relates to communications technology and more particularly to providing device-to-device or proximity communications services to devices used in wide-area networks.

Description of the Related Art

In general, proximity services (e.g., LTE-Direct) provide direct communications between devices using licensed or unlicensed frequency bands within a predetermined radius (e.g., a radius of 500 meters) to improve spectrum utilization, increase overall throughput, and reduce power consumption of radio access services. Device-to-device proximity services refers to communication services with little or no base station intervention between user equipment devices in proximity to each other. Functions for supporting proximity services include device-to-device proximity service discovery and device-to-device communication. Device-to-device proximity service discovery enables user equipment devices to use the wide-band area air interface to identify other user equipment devices that are in proximity. Device-to-device communication is the communication between at least two user equipment devices in proximity using the wide-band radio air interface to establish a direct link between user equipment devices without routing via a base station (e.g., eNode-B) or core network.

A typical user equipment device may be a host (e.g., send a discovery beacon) or a guest (e.g., sense the discovery beacon) for device-to-device proximity services. If a transmitter or sensor of the user equipment device is enabled at all times to facilitate discovery, discovery functions would drain the battery of the user equipment device. Discovery may be synchronous (e.g., searching during predetermined timeslots), but difficult to implement, or asynchronous (e.g., continuous searching) and having ease of implementation, but consuming higher-power. Accordingly, improved techniques for discovery are desired.

SUMMARY OF EMBODIMENTS OF THE DISCLOSURE

A technique for device-to-device proximity service discovery and communication is described. In at least one embodiment of the disclosure, a method includes detecting an event based on contents of a predetermined number of messages of a plurality of messages. Each message of the plurality of messages includes a predetermined tag. The predetermined number of messages is received from at least one user equipment device over a predetermined time period. The method includes triggering device-to-device communication having a proximity service area in response to detecting the event. Triggering the device-to-device communication may include identifying the proximity service area including the at least one user equipment device based on a location of each user equipment device of the at least one user equipment device. Triggering the device-to-device communication may include selecting a host user equipment device for the device-to-device communication from the at least one user equipment device based on attributes of the at least one user equipment device. Triggering the device-to-device communication may further include enabling direct discovery of the host user equipment device for discovery by other user equipment devices of the at least one user equipment device. The enabling may include providing an identifier of the host user equipment device to the other user equipment devices.

In at least one embodiment of the disclosure, an apparatus includes a processor and a memory device configured to store instructions executable on the processor to detect an event based on contents of a predetermined number of messages of a plurality of messages. Each message of the plurality of messages includes a predetermined tag. The predetermined number of messages are received from at least one user equipment device over a predetermined time period. The memory device is further configured to store instructions executable on the processor to trigger a device-to-device communication having a proximity service area in response to detection of the event. The instructions executable on the processor to trigger a device-to-device communication may include instructions executable on the processor to identify the proximity service area including the at least one user equipment device based on a location of each user equipment of the at least one user equipment device. The instructions executable on the processor to trigger a device-to-device communication may include instructions executable on the processor to select a host user equipment device for the device-to-device communication from the at least one user equipment device based on attributes of the at least one user equipment device. The memory device may be further configured to store instructions executable on the processor to enable direct discovery of the host user equipment device by other user equipment of the at least one user equipment device and to provide an identifier of the host user equipment device to the other user equipment device.

In at least one embodiment of the disclosure, a method includes receiving by a user equipment device, an indication of being selected as a host user equipment device in a device-to-device communication having a proximity service area including the user equipment device in response to a message including a predetermined tag communicated by the user equipment device. The method includes transmitting discovery beacon signals by the host user equipment device in response to receiving the indication. The method may include performing host-communication services by the host user equipment device using a predetermined device-to-device frequency band. The method may include communicating by the user equipment device a message including the predetermined tag.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

An automatic proximity discovery area technique uses available social network information to establish a proximity service area and to select and enable one or more host user equipment device for device-to-device proximity services. The automatic proximity discovery area technique reduces power consumption for device-to-device proximity service discovery and communications. The technique uses social network messages to detect events and initiate discovery of the device-to-device communications in a proximity discovery area without constant querying or permanent discovery facilities, thereby reducing power consumption of device-to-device proximity services.

Figure 1:
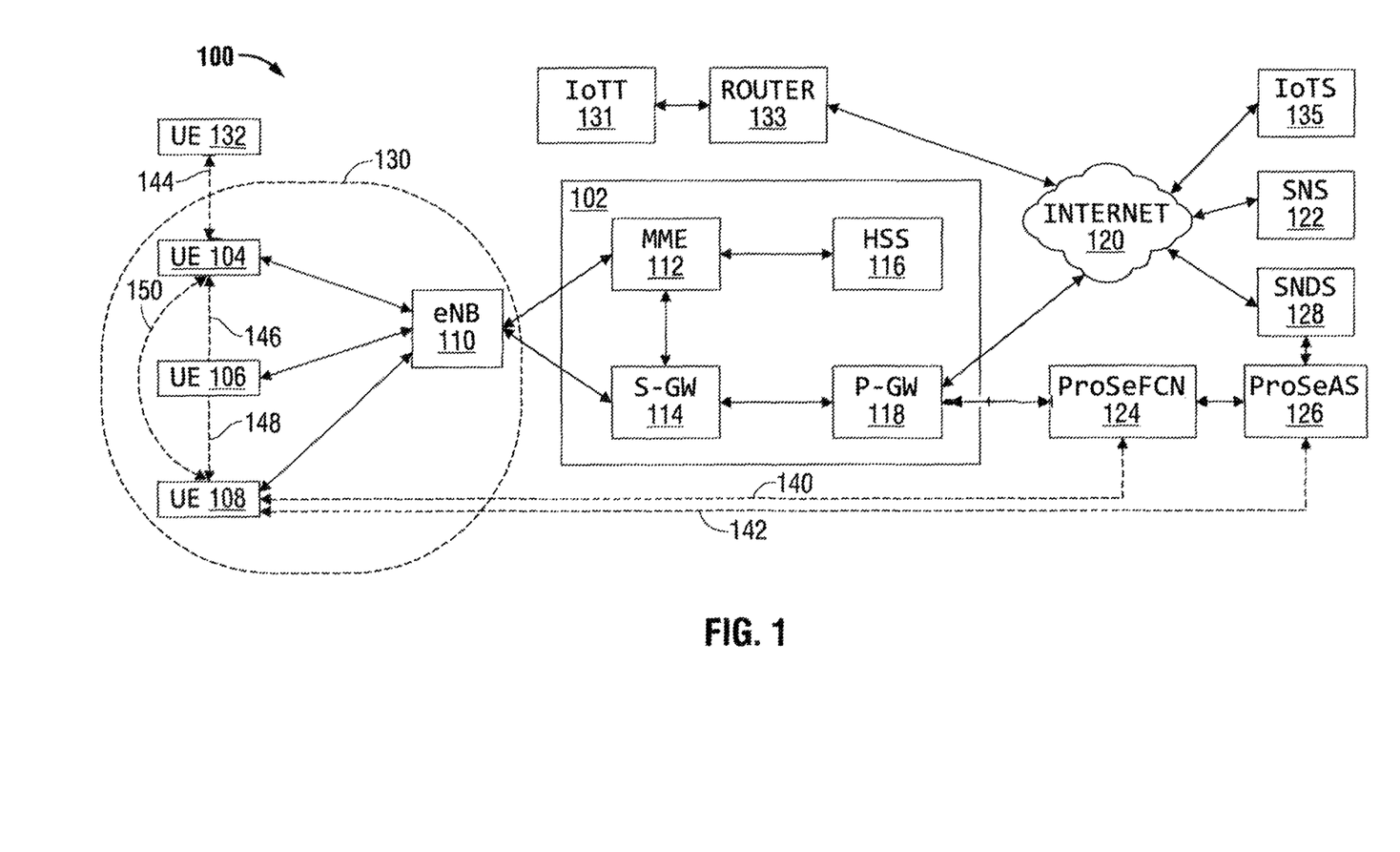
FIG. 1 illustrates a functional block diagram of an exemplary communications network consistent with at least one embodiment of the disclosure.

Referring to FIG. 1, exemplary wireless communications network 100 includes an evolved packet core network 102, which includes mobility management entity 112, serving gateway 114, packet data network gateway 118, and home subscriber server 120. Mobility management entity 112 performs signaling and control functions to manage access to network connections by user equipment devices in communication with evolved packet core network 102 and mobility management functions, e.g., idle mode location tracking, paging, roaming, and handovers. Mobility management entity 112 controls control plane functions related to subscriber and session management for service to user equipment devices in communication with evolved packet core network 102. In addition, mobility management entity 112 provides security operations including providing temporary identities for user equipment, interacting with home subscriber server 120 for authentication, and negotiation of ciphering and integrity protection algorithms. User equipment devices in communication with evolved packet core network 102 may be any wireless device directly used by a user to communicate (e.g., hand-held telephone, smartphone, laptop computer, tablet, wearable device, or other device configured with wireless communications equipment including a wireless transmitter and a wireless receiver). User equipment devices 104, 106, 108, and 132 communicate with evolved packet core network 102 using one or more base stations (e.g., eNode-B 110 or other base stations, not shown).

Proximity service function server 124 is part of the evolved packet core network and provides network services relevant to proximity services. For example, proximity service function server 124 provides authorization, authentication, and data handling related to proximity services. For proximity services direct discovery, user equipment devices may obtain specific identities, other configuration information, and authorization from proximity service function server 124 over communications 140. Communications 140 and 142 represent communications between proximity service function 124 and proximity service application server 126, respectively, with any of user equipment devices 104, 106 and 108 over evolved packet core network 102. A proximity service network is illustrated by region 130, which includes user equipment device 104, user equipment device 106, and user equipment device 108. User equipment device 104, user equipment device 106, and user equipment device 108 may discover and directly communicate with each other over air communications 146, 148, and 150 with little or no communications over evolved packet core network 102.

Proximity service application server 126 provides a specific application for which a particular user equipment device registers. Proximity service application server 126 coordinates with proximity service function server 124. Proximity service application server 126 may vary according to the target application, e.g., a proximity services application that maintains a current contacts list, a proximity services application that announces public service and/or emergency messages, or a proximity services application that maintains proximity areas for particular user equipment devices based on time of day (e.g., work hours, weekend, evenings, etc.). In some applications, target user equipment devices may be known (e.g., police, emergency services, etc.) or unknown (highly mobile user equipment devices).

In an exemplary public safety application, the proximity service application server must know the target area (e.g., a block of 5th Avenue where a fire is burning) and select the area perimeter (e.g., a device-to-device proximity service area) based on user equipment devices in the target area. The proximity service application server may select one or more static or slowly moving user equipment device in the proximity service area as one or more host user equipment device that will send discovery beacons. A host user equipment device may notify a guest user equipment device of the location of the host user equipment devices and the proximity service area. A guest user equipment device may report the device information to proximity service application server. In response to a guest user equipment device entering the proximity area of host user equipment device, the guest user equipment device enables direct discovery, and in response to sensing the host, begins device-to-device proximity service communications among the devices.

Rather than requiring user equipment device 104, user equipment device 106, and user equipment device 108 to have direct discovery sensors and beacons constantly enabled, social network discovery server 128 in cooperation with proximity service application server 126 determines a direct discovery proximity service area and triggers direct discovery by the user equipment devices in that direct discovery proximity area based on detection of an event using tagged messages received from social network server 122. Social network server 122 is configured to monitor social network messages received from user equipment for a predetermined tag (e.g., "#D") specific to the social network discovery server 128. When social network server 122 detects the predetermined tag, social network server 122 routes the associated message to social network discovery server 128. The predetermined tag may be inserted by the social network user.

Social network discovery server 128 maintains a database of predetermined tags, message content event triggers, locations of associated user equipment devices, and/or other related information. Exemplary message content event triggers include one or more words that indicate a natural disaster, traffic delay, or other event (e.g., "fire," "flood," "accident" and "car," "shooting," and may include a wildcard symbol, e.g., "flood$"). Social network discovery server 128 determines when a significant rate or volume of messages having the predetermined tag and one or more message content event trigger to detect an event (e.g., fire, natural disaster, shooting, etc.) and begins to determine the device-to-device proximity service area for that event so that user equipment devices (e.g., public safety user equipment devices or guest user equipment devices) may connect with a host user equipment device in the proximity area of the event. In addition, the database may include location information associated with each message. The location of user equipment may be determined based on a GPS coordinates, wireless access point geolocation techniques, identity of a base station to which the user equipment communicates, and/or other suitable technique.

Social network discovery server 128 may parse the message and compare portions of a message to the message content event triggers to detect an event and/or event type from the messages (e.g., "D#fire on $5^{th}$ Avenue"). Social network discovery server 128 may sort the messages and aggregates those of the same type (e.g., "D#fire," "D#flash flood," "D#auto accident," "D#power failure," "D#shooting," etc.) to determine a rate and/or volume of occurrences of each type of message content event trigger to detect a particular event based on one or more of tagged message volume and tagged message rate for messages having user equipment communicating from proximate locations. Proximity refers to actual physical distance and/or effective distance based on channel conditions, signal-to-interference-plus-noise ratio (SINR), throughput, delay, density, and load. Social network discovery server 128 may compare the tagged message volume and/or tagged message rate to corresponding threshold values stored in memory and detect an event if the tagged message volume and/or tagged message rate equals or exceeds the corresponding threshold value.

In response to detecting an event, social network discovery server 128, in cooperation with the proximity service application server 126, establishes a device-to-device proximity service area by selecting a host user equipment from the user equipment devices in proximity to, or otherwise related to, one or more of the devices that communicated the tagged message. The social network discovery server 128, in cooperation with proximity service application server 126, selects at least one of the user equipment devices in the device-to-device proximity service area to be a host user equipment device and may communicate the identity of the host user equipment device to the other user equipment devices in the device-to-device proximity service area. The host user equipment device may be selected from a plurality of user equipment devices in the device-to-device proximity service area based on one or more of speed of movement, battery life, signal strength, or other suitable characteristics. In at least one embodiment, guest user equipment devices in the device-to-device proximity service area may be selected based on location information, subscription information, social network contact lists, or other suitable criterion. For example, proximity service application server 126 selects public safety devices as hosts and general public devices as guests, selects wide-area network devices as hosts and local area network devices as guests, stationary devices as hosts and faster moving devices as guests. Selection may be a multi-step process, e.g., first, select hosts and guests based on high volume of social network messages and then, augment by other techniques described above. In at least one embodiment, social network discovery server 128 and proximity services application server 126 are integrated into one server including at least one processor executing functions of each using one or more software modules.

Social network discovery server 128 selects a user equipment device to be a host user equipment device, enables the host user equipment device to send discovery beacon signals for discovery by other user equipment in the proximity service area, and enables discovery in guest user equipment devices. The host user equipment device facilitates communications between user equipment devices subscribing to the same or difference carriers to communicate with each other on a predetermined frequency. A particular host user equipment device may be included in multiple discovery areas (e.g., one restricted to public safety devices, which has higher priority than general public devices, and a general public discovery area. The host user equipment device may reject particular devices in a discovery area based on any of the criteria described above if device to device communications become too congested. The host user equipment device may inform proximity services application server 126 that additional host user equipment devices are needed in the discovery area if device to device communications reach or exceed a traffic threshold. Proximity service application server 126 may dynamically update which user equipment devices operate as hosts and which user equipment devices operate as guests according to any of the criteria described above. The host user equipment device may relay communications from one guest user equipment device to another guest user equipment device in the proximity network.

Figure 2:
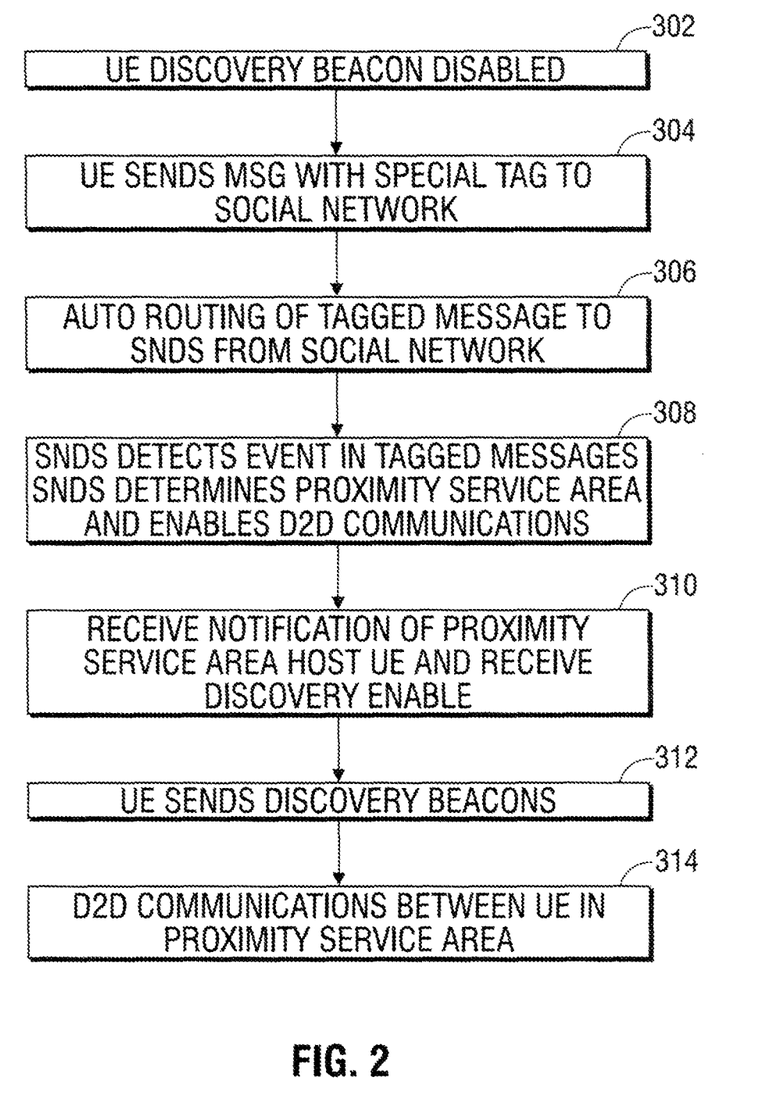
FIG. 2 includes a flowchart that depicts an exemplary information and control flow for automatic proximity discovery by user equipment in accordance with some embodiments of the disclosure.

Referring to FIG. 2, initially, the automatic proximity discovery technique configures subscribed user equipment devices to have discovery beacon transmission and detection features disabled (302). User equipment devices send one or more messages or status updates with a predetermined tag to one or more social network services (e.g., Facebook, Twitter, Instagram, LinkedIn, Line, or other social networking service) (304). The corresponding social network service automatically routes tagged messages to the social network discovery server (306). The social network discovery server detects an event based on the contents of the tagged messages, determines a proximity service area, and enables a device-to-device proximity service network (308).

Figure 3:
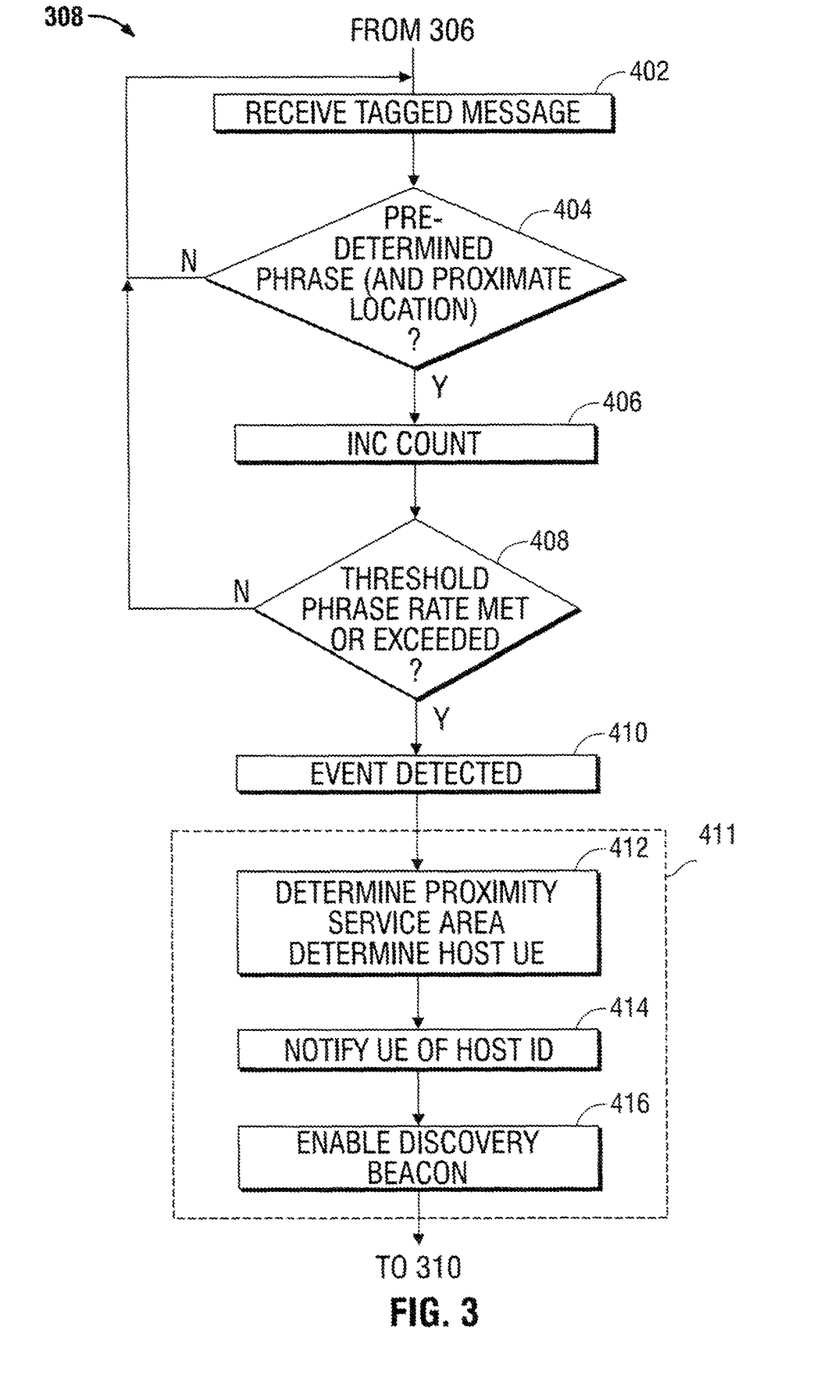
FIG. 3 includes a flowchart that depicts an exemplary information and control flow for automatic proximity discovery by an exemplary discovery server in accordance with some embodiments of the disclosure.

For example, referring to FIG. 3, a social network discovery server receives messages including the predetermined tag (402). The social network discovery server parses the messages and searches for one or more predetermined phrases in those messages (404). In addition, the social network discovery server maintains a database with the tagged messages and event triggering phrases in each message with a proximate location of the corresponding user equipment device and/or a timestamp indicative of the transmission time of the message. In response to detecting a particular predetermined event triggering phrase or similar predetermined event triggering phrase in a message, social network discovery server increments a count associated with that predetermined event triggering phrase and/or proximate location (406). Social network discovery server determines an event triggering phrase rate and compares that event triggering phrase rate to a threshold event triggering phrase rate. If the computed event triggering phrase rate is below the threshold event triggering phrase rate, the social network discovery server continues to receive and scan tagged messages without detecting an event (408). If the computed phrase rate equals or exceeds the event triggering phrase rate threshold, the social network discovery server detects an event (410). In response to detecting the event, the social network discovery server enables a corresponding device-to-device proximity network (411). For example, the social network discovery server may determine a proximity service area in cooperation with a proximity service application server based on user equipment devices subscribed to the proximity service and located in a particular radius of one or more user equipment devices that transmitted a tagged message associated with the event. The social network discovery server, alone or in combination with the proximity service application server, identifies a host user equipment from the user equipment devices included in the device-to-device proximity service network (412). The social network discovery server then notifies a user equipment device that it is the host user equipment for the device-to-device proximity service network (414). The social network discovery server enables transmission and detection of the discovery beacon for user equipment devices in the device-to-device proximity service network (416). The social network discovery server may perform the operations described herein independently or in cooperation with the proximity service application server. In addition, the social network discovery server operations described herein may be integrated into the proximity service application server.

Referring back to FIG. 2, user equipment devices may receive notification of the proximity service area, which may include identification of the host user equipment device and/or receiving a discovery mode enable (310). In response to being identified as the host user equipment device and receiving the discovery mode enable, a host user equipment device transmits discovery beacon signals (312). Other user equipment in the proximity service area receives those discovery beacon signals and establishes device-to-device communication (e.g., as a guest user equipment device) with the host user equipment device in the proximity service area (314). The device-to-device communications may include one or more of different modes of direct communication, e.g., unicast, relay, groupcast, and broadcast. In at least one embodiment, a user equipment device includes separate radio resources for communicating device-to-device communications. In other embodiments, the user equipment devices use the same radio resources for device-to-device communications as for the wide area network communications and the user equipment devices use uplink or downlink radio resources defined by Long Term Evolution technology or other communications standard. The device-to-device communication may use any suitable modulation format, which may be consistent with wide area network specifications (e.g., single carrier frequency-division multiple access in uplink and OFDMA in downlink consistent with LTE specifications).

Figure 4:
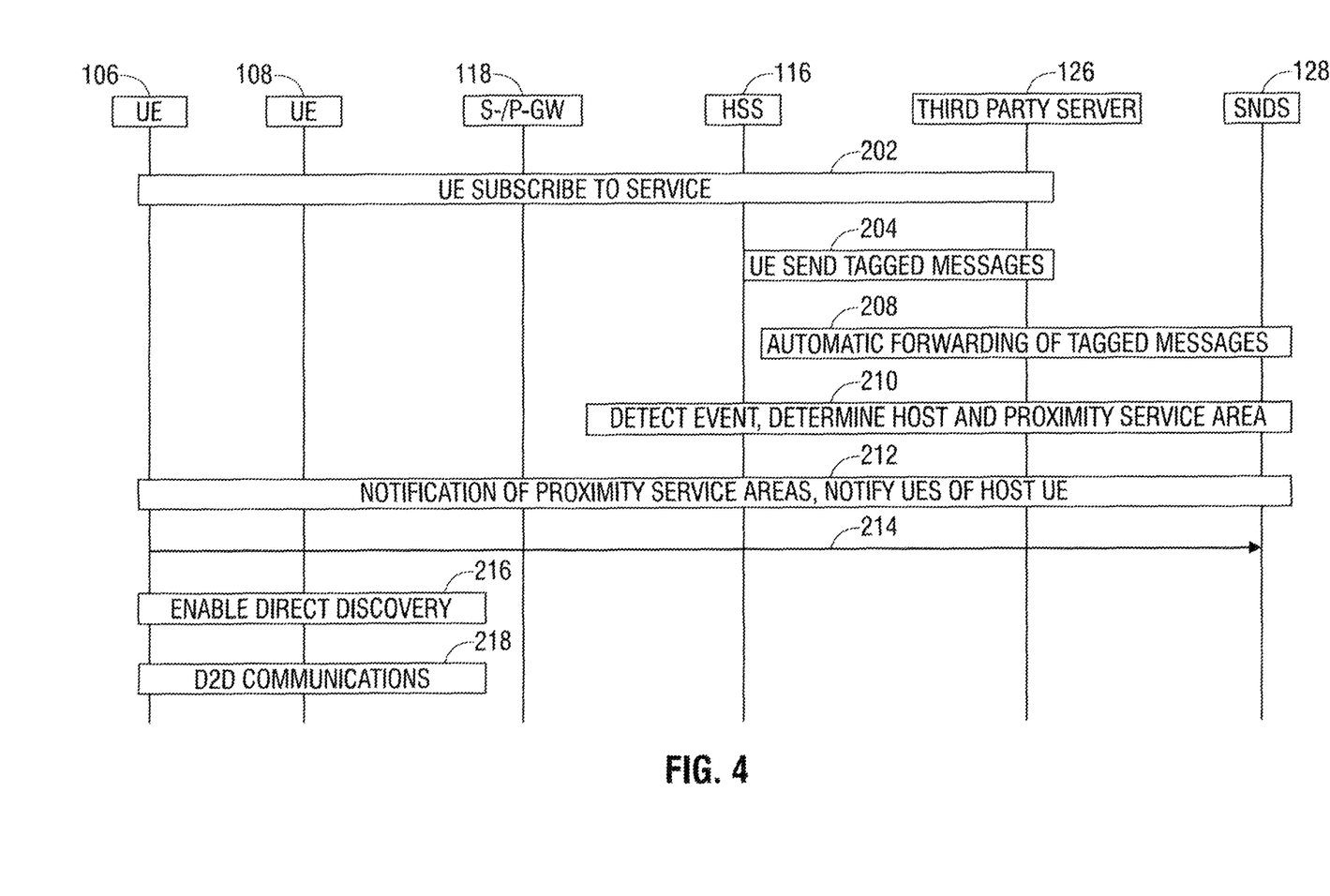
FIG. 4 includes a call flow that depicts an exemplary functional sequence for performing automatic proximity discovery for device-to-device proximity services in accordance with some embodiments of the disclosure.

FIG. 4 illustrates an exemplary call flow including communications between various elements of an exemplary communications network 100. User equipment devices 106 and 108 are subscribers to a social network service that may include social network server 122 separately owned and operated by a third-party service provider (202). One or more user equipment devices (which may include user equipment devices 106 and 108) send tagged messages to the social networking service via third-party server 126 (204). Third-party server 126 receives messages from user equipment and forwards any messages including the predetermined tag to social network discovery server 128 (208). Social network discovery server 128 processes those tagged messages and establishes a database associated with the tagged messages and uses that database to detect events, as described above. In response to detecting an event, social network discovery server 128 determines a device-to-device proximity service area and selects a host user equipment device in that proximity service area (210). Social network discovery server 128 notifies the user equipment devices of the device-to-device proximity service area and/or notifies one or more selected host user equipment device (212). The user equipment devices acknowledge the message (214) and enable device-to-device direct discovery (216). For example, the host user equipment device transmits a discovery beacon and guest user equipment devices listen to a dedicated or shared radio resource to sense the discovery beacon. The discovery beacon may include the identity of the particular application and the identity of the host user equipment device (218). Note that the information and control flows of FIGS. 2-4 are exemplary only one of skill in the art will appreciate that the teachings here may be used with other information and control flows consistent with the device-to-device proximity discovery area techniques described herein.

Figure 5:
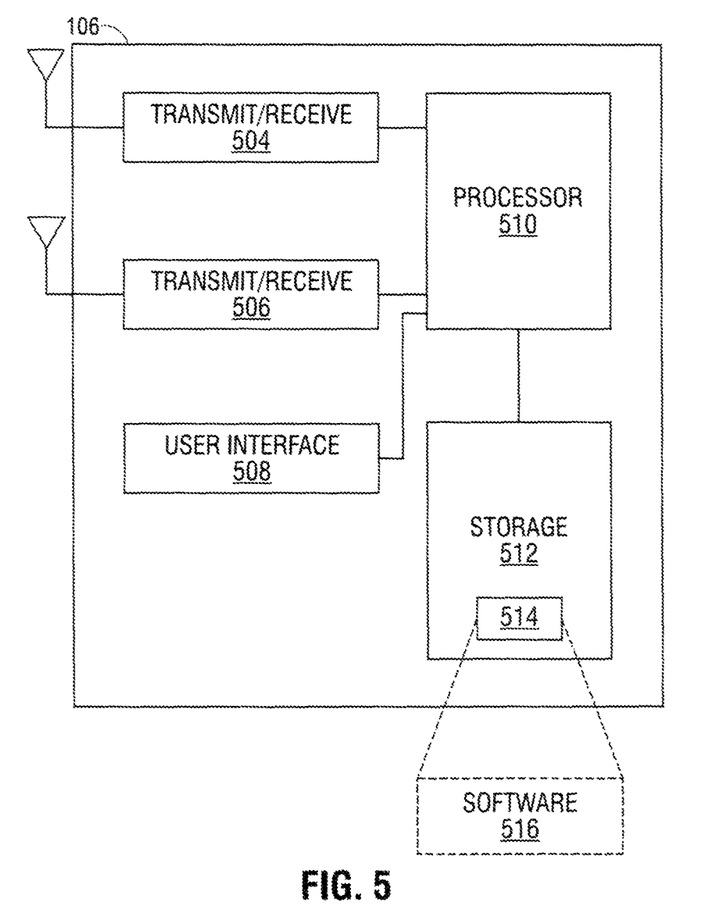
FIG. 5 illustrates a functional block diagram of exemplary user equipment for performing automatic proximity discovery for device-to-device proximity services in accordance with some embodiments of the disclosure.

Referring to FIG. 5, each user equipment device may include transmit and receive interface 504, transmit and receive interface 506, user interface 508, processor 510, and storage 512, which may include software 516. In at least one embodiment, the user equipment device includes separate radio resources for communicating device-to-device communications and for communicating over a wide-area network. For example, transmit and receive interface 504 may include radio resources for device-to-device communications coupled to an antenna for short-range communications between devices using predetermined spectrum, which may be licensed or unlicensed spectrum. Transmit and receive interface 506 may include radio resources for wide-band communications with a base station or eNodeB of a cellular network or other wide-area network using other predetermined spectrum (e.g., LTE spectrum). In other embodiments, the user equipment device includes one of transmit and receive interface 504 and transmit and receive interface 506 and uses the same radio resources and antenna for device-to-device proximity services and wide area network communications. The device-to-device communications may use any suitable modulation format, which may be consistent with wide-area network specifications (e.g., single carrier frequency-division multiple access in uplink and OFDMA in downlink consistent with LTE specifications). Software 516 may include instructions for receiving notifications of a host user equipment, identification of the device-to-device proximity service area, and enabling direct discovery in response to an enable received from the social network discovery server or proximity service server.

As referred to herein, user equipment may be a mobile phone, laptop, tablet, wearable device, server, or other computing system. User equipment 106 includes a processor 510, such as a controller, microprocessor, microcontroller or similar data processing device that executes program instructions of software 516 stored in location 514 of storage 512. Typical transmitter functions including coding, mapping, and modulation are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The transmitter and receiver functions may be implemented in various combinations of analog and digital logic. In particular, the transmitter and receiver functions may use digital signal processing and processor 510 represents the necessary digital signal processing capability to implement necessary digital signal processing functions, even though one or more separate digital signal processors or coprocessors may be provided in user equipment device 106.

Storage 512 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

Processor 510 may be implemented as a single special purpose integrated circuit (e.g., ASIC) having a main or central processor unit for overall, system-level control, and separate sections dedicated to performing various specific computations, functions, and other processes under the control of the central processor unit. Processor 510 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. Processor 510 may also include other circuitry or components, such as memory devices, relays, mechanical linkages, communications devices, drivers and other ancillary functionality to affect desired control and/or input/output functions.

Processor 510 may be operatively coupled with user interface 508. User interface 508 may include items known in the art, such as a display, keypad, speaker, microphone, and other user interface I/O components. In one embodiment the processor 510 provides functionality to achieve device-to-device communication. In the illustrated embodiment the controller utilizes software functionality 516 stored in memory 514 to implement at least a portion of the logic necessary to achieve the correct functionality as described herein. While software may be used to implement aspects of control in user equipment, some aspects, such as signal strength measurement and establishing subflows utilize at least some hardware circuits and the particular segmentation between software and hardware control is implementation-specific and thus can vary in different embodiments.

Figure 6:
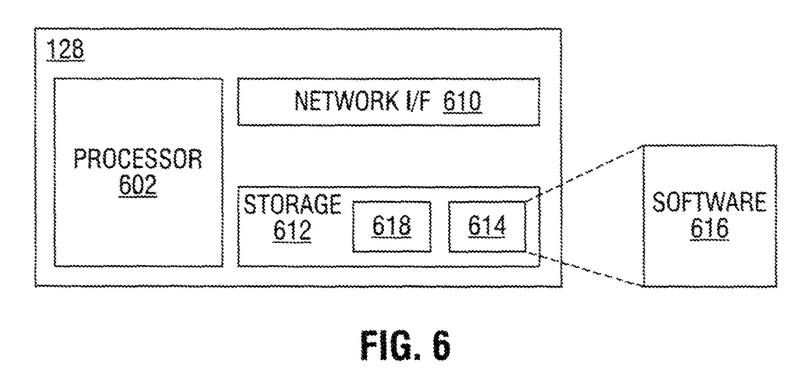
FIG. 6 illustrates a functional block diagram of exemplary discovery server for performing automatic proximity discovery for device-to-device proximity services in accordance with some embodiments of the disclosure.

Referring to FIG. 6, an exemplary social network discovery server 128 includes network interface 410, processor 402, and storage 412, which may include data storage 418 and instruction storage 414, which includes software 416. Software 416 may include instructions for receiving tagged messages, identifying events in tagged messages, creating and maintaining a database of information associated with tagged messages as described above, generating a device-to-device proximity service area, identifying a host user equipment for the device-to-device proximity service area, and generating and sending messages to enable direct discovery by the user equipment in the device-to-device proximity service area.

Although user equipment devices may be smartphone devices executing social network applications that generate messages used to create device-to-device proximity service area, other devices may be used. For example, referring back to FIG. 1, rather than the user equipment device being a smartphone, the user equipment device may be a device including an Internet-of-Things transceiver 131 (e.g., a transceiver in residential appliance, an automobile application, security application, or other suitable Internet-of-Things application) that communicates electronic messages to an application executing on Internet-of-Things server 135 via router 133 and Internet 120.

Techniques described herein establish a device-to-device proximity service using less user equipment device power than techniques that constantly enable discovery. Utilizing available social network applications to implement a device-to-device proximity service area and automatic enabling of discovery by user equipment devices, and post-processing using one or more back-end server without substantial overhead between devices reporting/receiving messages to/from a proximity service application server to communicate device-to-device reduces cost, and may increase accuracy of a device-to-device communications as compared to other device-to-device proximity service discovery area techniques.

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

The description set forth herein is illustrative, and is not intended to limit the scope of the disclosure as set forth in the following claims. For example, while embodiments have been described in which Long Term Evolution proximity services are used, one of skill in the art will appreciate that the teachings herein can be utilized with other proximity services associated with other communications standards. Variations and modifications of the embodiments disclosed herein, may be made based on the description set forth herein, without departing from the scope and spirit of the disclosure as set forth in the following claims.

What is claimed is:

1. A method comprising:
   detecting an event based on contents of a predetermined number of messages of a plurality of social network messages, each message of the plurality of social network messages including a predetermined tag, the predetermined number of messages being received from at least one user equipment device over a predetermined time period; and
   triggering device-to-device communication having a proximity service area in response to detecting the event, wherein triggering device-to-device communication comprises:
   selecting a host user equipment device for the device-to-device communication from the at least one user equipment device based on attributes of the at least one user equipment device; and
   after the selecting of the host user equipment device, enabling direct discovery of the host user equipment device for discovery by other user equipment devices, the enabling including providing an identifier of the host user equipment device to the other user equipment devices and enabling transmission of direct discovery beacon signals by the host user equipment devicein response to transmission of the direct discovery beacon signals by the host user equipment device being disabled when detecting the event.

2. The method, as recited in claim 1, wherein triggering the device-to-device communication comprises:
   identifying the proximity service area including the at least one user equipment device based on a location of each user equipment device of the at least one user equipment device.

3. The method, as recited in claim 2, further comprising:
communicating, by one or more of the at least one user equipment device, a message including the predetermined tag.

4. The method, as recited in claim 2, further comprising: directly communicating between the host user equipment device and another user equipment device of the at least one user equipment device using a predetermined device-to-device frequency band.

5. The method, as recited in claim 2, wherein the attributes include rate of location, movement, remaining battery life, proximity to nearest base station, or proximity to base station associated with the event.

6. The method, as recited in claim 1, further comprising: transmitting direct discovery beacon signals by the host user equipment device in response to enabling direct discovery.

7. The method, as recited in claim 1, further comprising: routing the plurality of social network messages including the predetermined tag to a social network discovery server in response to detecting the predetermined tag in each message of the plurality of social network messages.

8. The method, as recited in claim 1, wherein the plurality of social network messages includes messages from devices coupled to a social network server via the Internet.

9. The method, as recited in claim 1, further comprising: monitoring contents of the plurality of social network messages including the predetermined tag for a predetermined phrase corresponding to the event to identify the predetermined number of messages.

10. The method, as recited in claim 1, wherein the event is detected by a social network discovery server and the plurality of social network messages includes social network messages from the at least one user equipment device.

11. The method, as recited in claim 1, wherein the host user equipment device is selected based on volume of social network messages.

12. The method, as recited in claim 1, further comprising: prior to detecting the event, initializing the transmission of direct discovery beacon signals by the host user equipment device to be disabled, the transmission of direct discovery beacon signals being disabled until after detecting the event.

13. The method, as recited in claim 1, further comprising: prior to detecting the event, initializing the transmission of direct discovery beacon signals by the at least one user equipment device to be disabled, the transmission of direct discovery beacon signals being disabled until after detecting the event.

14. An apparatus comprising:
a social network discovery server comprising:
a processor; and
a memory device configured to store instructions executable on the processor to detect an event based on contents of a predetermined number of messages of a plurality of social network messages, each message of the plurality of social network messages including a predetermined tag, the predetermined number of messages being received from at least one user equipment device over a predetermined time period; and
wherein the memory device is further configured to store instructions executable on the processor to trigger a device-to-device communication having a proximity service area in response to detection of the event, the instructions including instructions executable on the processor to select a host user equipment device for the device-to-device communication from the at least one user equipment device based on attributes of the at least one user equipment device, and after selection of the host user equipment device, to enable direct discovery of the host user equipment device for discovery by other user equipment devices by providing an identifier of the host user equipment device to the other user equipment devices and to enable transmission of direct discovery beacon signals by the host user equipment device in response to transmission of the direct discovery beacon signal by the host user equipment device being disabled when detecting the event.

15. The apparatus, as recited in claim 14, wherein instructions executable on the processor to trigger a device-to-device communication include instructions executable on the processor to identify the proximity service area including the at least one user equipment device based on a location of each user equipment device of the at least one user equipment device.

16. The apparatus, as recited in claim 15, wherein the attributes include rate of movement, remaining battery life, proximity to a nearest base station, or proximity to a base station associated with the event.

17. The apparatus, as recited in claim 15, further comprising:
a plurality of user equipment devices configured for device-to-device communication in the proximity service area in response to the event.

18. The apparatus, as recited in claim 15, further comprising:
a second processor; and
a second memory device configured to store instructions executable on the second processor to route the plurality of social network messages including the predetermined tag to the social network discovery server in response to detecting the predetermined tag in each message of the plurality of social network messages.

19. The apparatus, as recited in claim 14, wherein the memory device is further configured to store instructions executable on the processor to monitor contents of the plurality of social network messages including the predetermined tag for a predetermined phrase corresponding to the event to identify the predetermined number of messages.

20. The apparatus, as recited in claim 14, wherein the plurality of social network messages includes social network messages from the at least one user equipment device.

* * * * *

UNITED STATES PATENT AND TRADEMARK OFFICE
CERTIFICATE OF CORRECTION

PATENT NO. : 10,341,833 B2
APPLICATION NO. : 14/936810
DATED : July 2, 2019
INVENTOR(S) : Gaviphat Lekutai It is certified that error appears in the above-identified patent and that said Letters Patent is hereby corrected as shown below:

In the Claims

In Column 10, Line 58, please replace "devicein" with --device in--.

Signed and Sealed this
Twentieth Day of August, 2019

Andrei Iancu
*Director of the United States Patent and Trademark Office*